United States Patent
Yu et al.

(10) Patent No.: US 10,412,203 B2
(45) Date of Patent: Sep. 10, 2019

(54) HANDHELD ELECTRONIC DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongyang Yu, Beijing (CN); Shuai Gao, Beijing (CN); Litao Fan, Beijing (CN); Yufei Liu, Beijing (CN)

(73) Assignees: BOE TECHNOLOGY GROUP CO., LTD., Beijing (CN); BEIJING BOE OPTOELECTRONICS TECHNOLLOGY CO., LTD., Beijing (CN)

( * ) Notice: Subject to any disclaimer, the term of this patent is extended or adjusted under 35 U.S.C. 154(b) by 0 days.

(21) Appl. No.: 16/011,289

(22) Filed: Jun. 18, 2018

(65) Prior Publication Data

US 2019/0208042 A1 Jul. 4, 2019

(30) Foreign Application Priority Data

Jan. 2, 2018 (CN) .......................... 2018 1 0002665

(51) Int. Cl.
*H04M 1/02* (2006.01)
*H04M 1/18* (2006.01)
*H04M 1/04* (2006.01)

(52) U.S. Cl.
CPC ............ *H04M 1/0202* (2013.01); *H04M 1/04* (2013.01); *H04M 1/185* (2013.01)

(58) Field of Classification Search
CPC ............................. H04M 1/0202; H04M 1/185
See application file for complete search history.

(56) References Cited

U.S. PATENT DOCUMENTS

| | | | | |
|---|---|---|---|---|
| 2002/0011402 A1* | 1/2002 | Ohmoto | ................ | G06F 3/0362 200/4 |
| 2002/0021286 A1* | 2/2002 | Choi | ................... | G06F 3/03543 345/168 |
| 2002/0167489 A1* | 11/2002 | Davis | .................. | G06F 3/03547 345/157 |
| 2003/0114119 A1* | 6/2003 | Liang | .................. | H04M 1/0202 455/90.1 |
| 2007/0063969 A1* | 3/2007 | Wright | .................. | G06F 1/1616 345/156 |
| 2010/0148043 A1* | 6/2010 | Liao | ......................... | G01C 9/12 250/231.1 |
| 2017/0142660 A1* | 5/2017 | Chatterton | ........ | H04W 52/0254 |

FOREIGN PATENT DOCUMENTS

| | | |
|---|---|---|
| CN | 201118682 Y | 9/2008 |
| CN | 202127435 U | 1/2012 |
| CN | 204669017 U | 9/2015 |
| FR | 2901692 A1 | 12/2007 |

OTHER PUBLICATIONS

Search Report dated Jun. 24, 2019, received for corresponding Chinese Application No. 201810002665.4.
First Chinese Office Action dated Jul. 1, 2019, received for corresponding Chinese Application No. 201810002665.4.

* cited by examiner

*Primary Examiner* — Brandon J Miller
(74) *Attorney, Agent, or Firm* — Kinney & Lange, P.A.

(57) ABSTRACT

A handheld electronic device is provided. The handheld electronic device includes a housing, wherein a universal ball structure is provided at a corner of the housing. The universal ball structure includes a groove, and a ball in the groove.

17 Claims, 5 Drawing Sheets

HANDHELD ELECTRONIC DEVICE

CROSS-REFERENCE TO RELATED APPLICATION

This application claims the priority benefit of Chinese Patent Application No. 201810002665.4 filed on Jan. 2, 2018 in the State Intellectual Property Office of China, the disclosure of which is incorporated herein by reference in entirety.

BACKGROUND

Technical Field

Embodiments of the present disclosure relate to the field of electronic devices, and in particular, to a handheld electronic device.

Description of the Related Art

At present, in common handheld electronic devices, such as a mobile phone or a tablet computer, most devices adopt a full touch bar liquid crystal screen, except a few models using a form of flip appearance. As liquid crystal screen technology for the handheld electronic devices develops continually, and module process technology progresses continually, the handheld electronic devices are increasingly developing and become ultra-thin with ultra-narrow frames.

SUMMARY

An embodiment of the present disclosure provides a handheld electronic device comprising a housing, wherein a universal ball structure is provided at a corner of the housing.

In some embodiments, the universal ball structure comprises:
a groove; and
a ball in the groove.

In some embodiments, the ball is rollable in the groove.

In some embodiments, the universal ball structure further comprises an elastic material between the groove and the ball.

In some embodiments, the elastic material is rubber or elastic polymer.

In some embodiments, the ball is made of steel, carbon steel or plastic steel.

In some embodiments, the groove has an accommodating space with a shape between a sphere and a hemisphere, or has an accommodating space with a hemisphere shape, or has an accommodating space with a partial sphere shape smaller than the hemisphere shape, so that a portion of the ball emerges from an opening of the groove.

In some embodiments, a surface area of the portion of the ball emerging from the groove is at least 50% of a surface area of the ball.

In some embodiments, the universal ball structure further comprises a seal disposed at an opening of the groove between the groove and the ball.

In some embodiments, the ball is internally provided with a telescopic rod capable of extending and retracting in a radial direction of the ball, and
in an extended state, the telescopic rod extends out of the ball, and in a retracted state, the telescopic rod is fully retracted in an internal of the ball.

In some embodiments, the telescopic rod comprises:
a sleeve; and
a spring arranged in the sleeve in an axis direction of the sleeve,
wherein, with the spring in a natural state, the sleeve extends out of the ball, and with the spring in a compressed state, the sleeve is fully retracted in the internal of the ball.

In some embodiments, the sleeve is provided with an anti-skid material cladding layer at an end thereof.

In some embodiments, the ball is internally provided with an accommodating groove for accommodating the sleeve, one end of the spring is fixed to an end of the accommodating groove away from an opening of the accommodating groove, and the other end of the spring is fixed to an end of the sleeve.

In some embodiments, the telescopic rod comprises:
a multi-stage sleeve in which a plurality of sleeves are coaxially arranged and have different diameters; and
a spring disposed within the multi-stage sleeve in an axis direction of the multi-stage sleeve,
wherein, with the spring in a natural state, the plurality of sleeves extends out of the ball one by one, and with the spring in a compressed state, the multi-stage sleeve is fully retracted in the internal of the ball.

In some embodiments, the multi-stage sleeve comprises a primary sleeve and a secondary sleeve, and the secondary sleeve is coaxially disposed within the primary sleeve.

In some embodiments, the secondary sleeve is provided with an anti-skid material cladding layer at an end thereof.

In some embodiments, the ball is internally provided with an accommodating groove for accommodating the multi-stage sleeve, one end of the spring is fixed to an end of the accommodating groove away from an opening of the accommodating groove, and the other end of the spring is fixed to an end of the secondary sleeve.

In some embodiments, the telescopic rod is made of steel, carbon steel or plastic steel.

BRIEF DESCRIPTION OF THE DRAWINGS

In order to more clearly describe embodiments of the present disclosure or technical solutions in the related art, the drawings used in the description of the embodiments or the related art will be briefly described below. Apparently, the drawings in the following description only correspond to some embodiments of the present disclosure, and other drawings may also be obtained by those skilled in the art based on these drawings without any creative efforts.

DETAILED DESCRIPTION OF EMBODIMENTS

In order to make the objectives, technical solutions, and advantages of the present disclosure clearer, the present disclosure will be further described in detail with reference to specific embodiments and accompanying drawings.

An edge of a screen of a handheld electronic device is getting closer and closer to an edge of the handheld electronic device. This design form has better appearance and using effect, but it also increases risk of breakage of an edge or corner of a housing of the handheld electronic device and breakage of the screen of the handheld electronic device when the handheld electronic device accidentally drops. In view of this, many users of handheld electronic devices have to protect the handheld electronic devices with protective sleeves, but the protective sleeve will increase the overall thickness of the handheld electronic device, affecting touch feeling and affecting heat dissipation performance of the handheld electronic device.

The embodiments of the present disclosure propose a handheld electronic device with a drop-resistant structure, which effectively reduces the risk of breakage of the edge or corner of the housing of the handheld electronic device and breakage of the screen of the handheld electronic device when the handheld electronic device accidentally drops.

The embodiments of the present disclosure provide a handheld electronic device having a drop-resistant structure. For convenient and intuitive description, in the subsequent embodiments of the present disclosure, a mobile phone is taken as an example for specific description. Obviously, the drop-resistant structure can also be applied to other common handheld electronic devices, such as a tablet computer (or known as a PAD), a digital photo frame, and a navigator without hindrance, so as to constitute the handheld electronic device with the drop-resistant structure.

Figure 1:
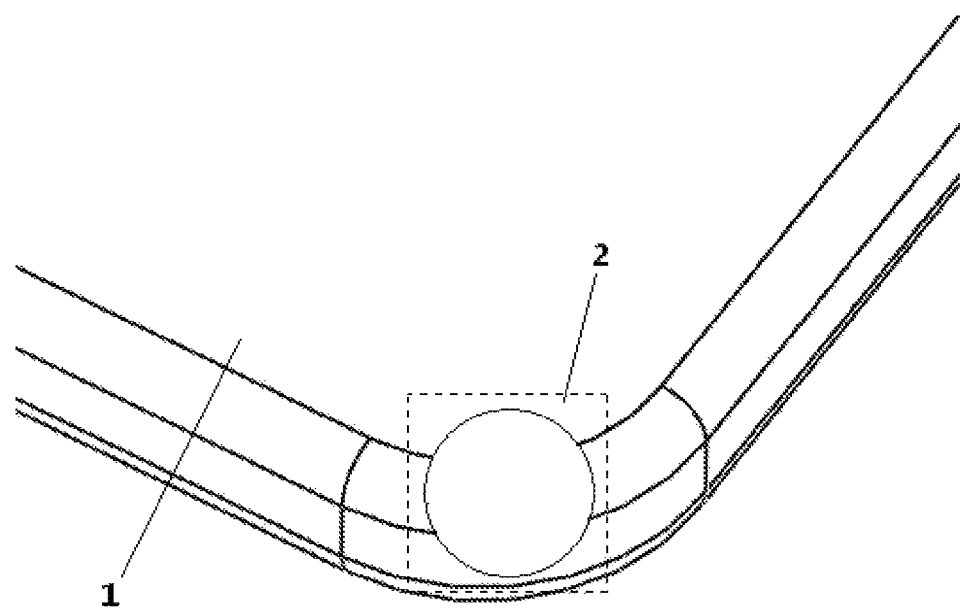
FIG. 1 is a schematic structural view of a corner of a housing of a mobile phone according to an embodiment of the present disclosure.
Figure 2:
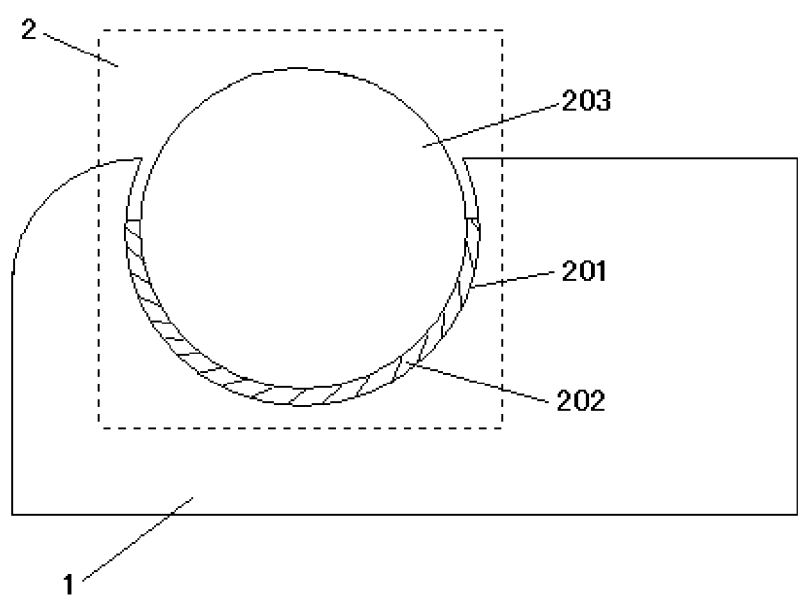
FIG. 2 is a structural cross-sectional view of a corner of a housing of a mobile phone according to an embodiment of the present disclosure.

An embodiment of the present disclosure provides a mobile phone, referring to FIG. 1 and FIG. 2, the mobile phone includes a housing 1. The housing 1 serves as a casing structure to accommodate an internal circuit board, a display screen, physical buttons of the mobile phone, and the like. The housing 1 is generally in a form of cuboid. In some special designs, the housing 1 may also be cubic or have other special-shaped structure. In this embodiment, a cuboid housing 1 of the handheld electronic device is taken as an example. The cuboid housing 1 is formed in a generally flat shape, i.e., its length and width dimensions are much greater than its height (or thickness) dimension, so the housing of the handheld electronic device has four corners. Only one corner is shown in FIG. 1. A universal ball structure 2 is provided at the corner of the housing 1. The universal ball structure 2 includes: a groove 201 disposed at the corner of the housing; and a ball 203 disposed in the groove 201 via an elastic material 202. The groove 201 may be substantially spherical or hemispherical, that is, has an accommodating space with a shape of substantially sphere or hemisphere, for example, the groove 201 may have an accommodating space with a shape between a sphere and a hemisphere, or may have an accommodating space with a hemisphere shape, or may have an accommodating space with a partial spherical shape smaller than the hemisphere shape, so that a portion of the ball emerges from an opening of the groove. The ball 203 is embedded in the groove 201. Based on structural characteristics of the universal ball structure, exemplarily, the groove 201 includes an opening, a portion of the ball 203 is exposed through the opening of the groove 201, and the ball 203 can roll freely in the groove.

In the mobile phone according to this embodiment, four universal ball structures 2 are integrally provided at four corners of the housing 1. In terms of the overall structure, at the four corners of the housing 1, the balls 203 in the universal ball structures 2 slightly protrude from the profile of the housing 1. When the mobile phone accidentally drops, the initial contact point where the corner of the housing 1 touches and impacts the ground is at the ball 203. Meanwhile, since the ball 203 can roll freely in the groove 201 in the housing 1, an acting force coming from the contact with the ground may be effectively buffered by the rolling ball 203 during the impact, thereby having a good shock absorption effect. In a specific implementation, in order to ensure the strength of the housing 1 (especially the corner), the ball is made of a hard material, such as steel, carbon steel or plastic steel.

Further, in the universal ball structure 2, the ball 203 is disposed in the groove 201 via the elastic material 202. The elastic material 202 is interposed between the ball 203 and the groove 201, and acts like a bearing, so that the ball 203 can roll in the groove 201. On one hand, the elastic material 202 ensures unhindered, smooth rolling of the ball 203 in the groove 201, and on the other hand, based on characteristics of the elastic material, it can allow the ball 203 to compress the elastic material 202 to a certain extent under a collision acting force when the mobile phone accidentally drops and the corner of the housing 1 is impacted, thereby further reducing the acting force and therefore having a better shock absorption effect. In a specific implementation, the elastic material 202 may be rubber or other elastic polymer.

It can be seen that, in the mobile phone according to the embodiments of the present disclosure, the universal ball structure 2 composed of the groove 201, the elastic material 202, and the ball 203 is disposed at the corner of the housing 1. In this way, when the mobile phone accidentally drops, the universal ball structure 2 achieves buffering and shock absorption, thereby effectively reducing the risk of breakage of the edge or corner of the housing 1 of the mobile phone and breakage of the screen of the mobile phone.

In an alternative embodiment, the ball is internally provided with a telescopic rod capable of extending and retracting in a radial direction of the ball, and in an extended state, the telescopic rod extends out of the ball, and in a retracted state, the telescopic rod is fully retracted in an internal of the ball. When the telescopic rod extends out of the ball, it can play a supporting role for the whole mobile phone, so that the mobile phone can stand on any plane carrier to facilitate a user to watch the screen of the mobile phone. After completing the viewing, the user only needs to retract the telescopic rod into the ball. In a specific implementation, in order to ensure the structural strength of the telescopic rod, the telescopic rod is made of a hard material, such as steel, carbon steel or plastic steel.

Figure 3:
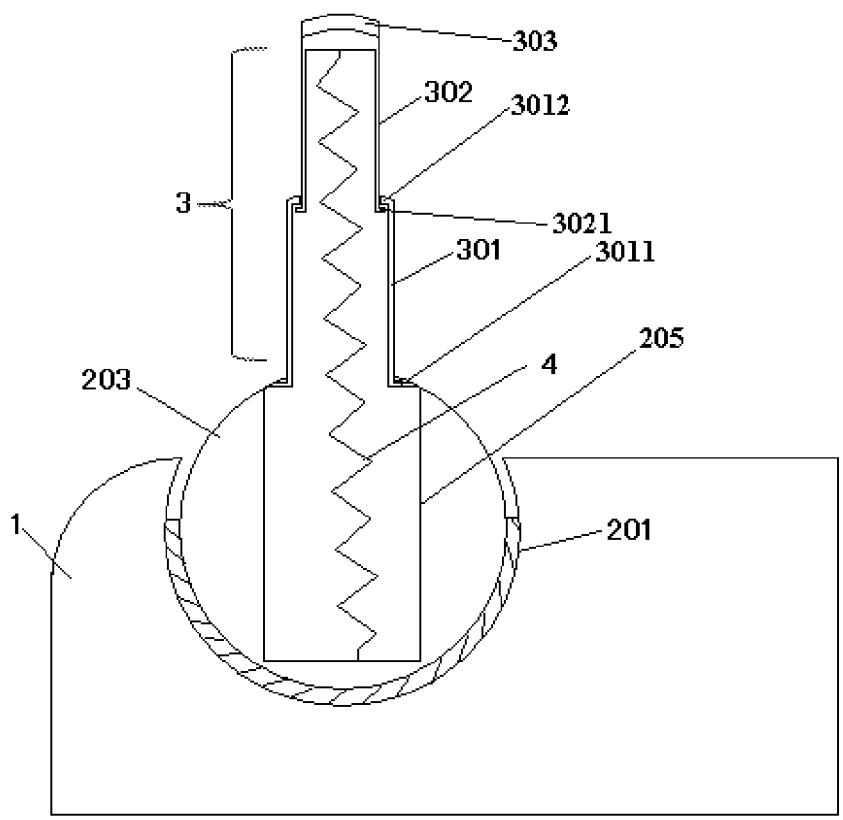
FIG. 3 is a structural cross-sectional view of a telescopic rod in an extended state according to an embodiment of the present disclosure.
Figure 4:
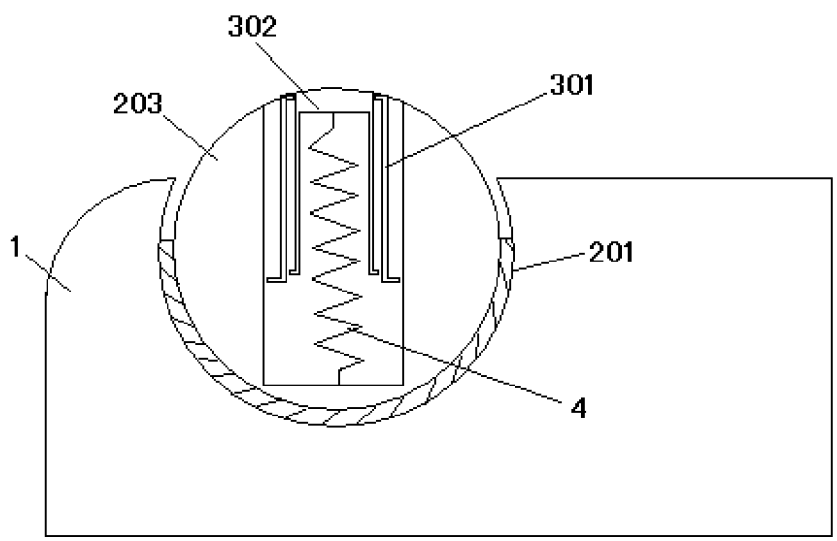
FIG. 4 is a structural cross-sectional view of a telescopic rod in a retracted state according to an embodiment of the present disclosure.
Figure 5:
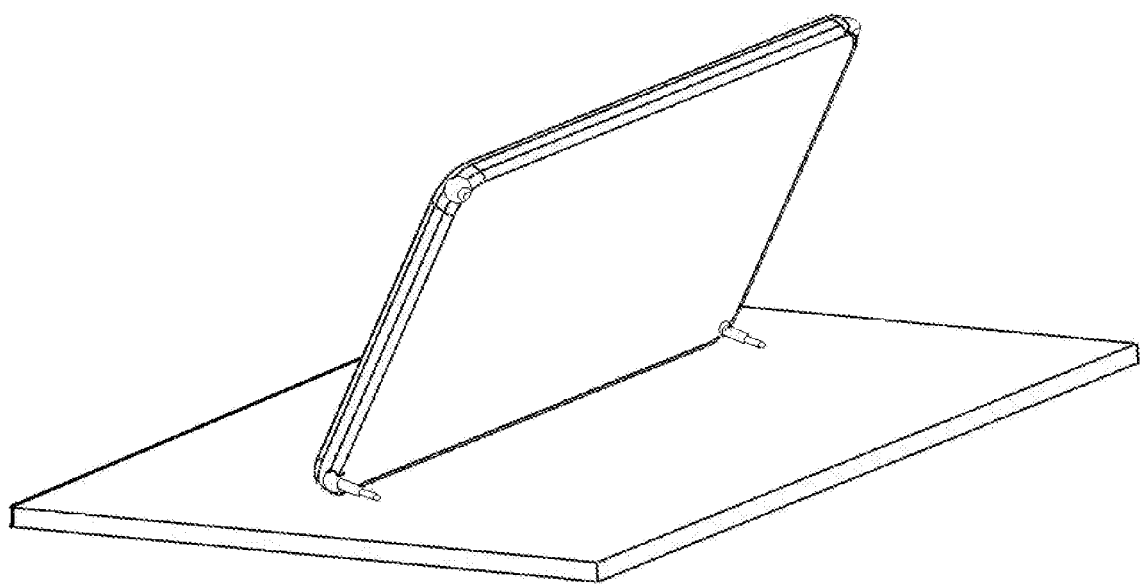
FIG. 5 is a schematic view showing a supporting state of a mobile phone in a horizontal orientation according to an embodiment of the present disclosure.

Specifically, referring to FIG. 3, FIG. 4, and FIG. 5, the telescopic rod comprises: a multi-stage sleeve 3 in which a plurality of sleeves are coaxially arranged and have different diameters; and a spring 4 disposed within the multi-stage sleeve 3 in an axis direction of the multi-stage sleeve 3. For the multi-stage sleeve 3, different number of stages only affects the overall length of the telescopic rod, therefore the structural feature and working method of the plurality of sleeves may be same. Thus, in the present embodiment, a two-stage sleeve is taken as an example to describe the structural feature and working method of the telescopic rod. That is, the multi-stage sleeve 3 includes a primary sleeve 301 and a secondary sleeve 302. The ball 203 is internally provided with an accommodating groove 205 for accommodating the multi-stage sleeve 3, as shown in FIG. 3. The secondary sleeve 302 is coaxially disposed within the primary sleeve 301. The spring 4 is disposed inside the primary sleeve 301 and the secondary sleeve 302 and extends in an axial direction thereof. One end of the spring 4 is fixed to an end of the accommodating groove 205 away from the surface of the ball, and the other end of the spring is fixed to an end of the secondary sleeve 302. Referring to FIG. 3, when the spring 4 is in a natural state (corresponding to a state in which the telescopic rod extends out), the multi-stage sleeve 3 extends out of the ball 203 one by one; referring to FIG. 4, when the spring 4 is in a compressed state (corresponding to a state in which the telescopic rod is pressed back), the multi-stage sleeve 3 is fully retracted in the internal of the ball 203.

Specifically, referring to FIG. 3, the primary sleeve 301 includes a cylinder, a first edge 3011 extending outwardly from the cylinder and perpendicular to the cylinder, and a second edge 3012 extending inwardly from the cylinder and perpendicular to the cylinder, and the first edge 3011 is located at a lower end of the primary sleeve 301 and the second edge 3012 is located at an upper end of the first stage sleeve 301. The secondary sleeve 302 includes a cylinder and a third edge 3021 extending outwardly from the cylinder and perpendicular to the cylinder, and the third edge 3021 is located at a lower end of the secondary sleeve 302. The first edge 3011 serves to contact with an opening edge of the accommodating groove 205 when the multi-stage sleeve extends out of the ball 203, to limit an excessive movement of the primary sleeve 301, that is, it provides a limit function. The second edge 3012 and the third edge 3021 serve to contact each other when the multi-stage sleeve extends out of the ball 203, to limit an excessive movement of the secondary sleeve 302, that is, they provide a limit function.

Figure 6:
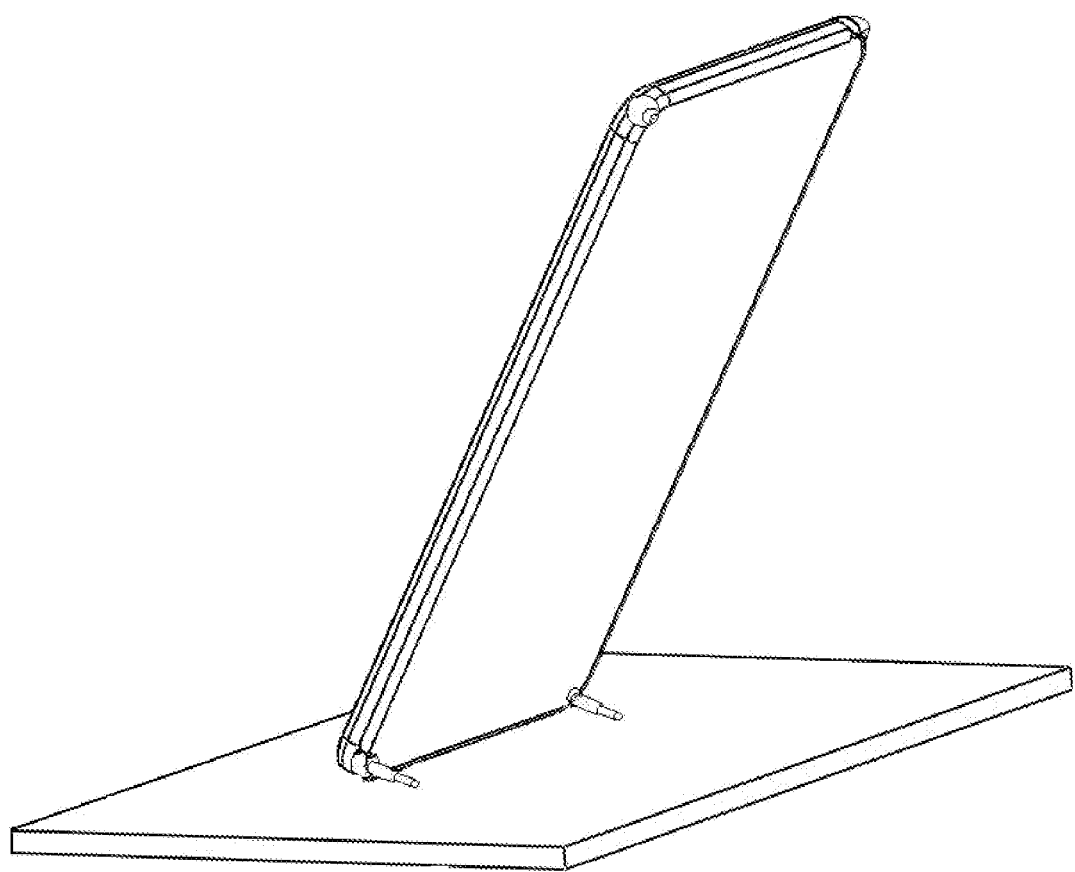
FIG. 6 is a schematic view showing a supporting state of a mobile phone in a vertical orientation according to an embodiment of the present disclosure.
Figure 7:
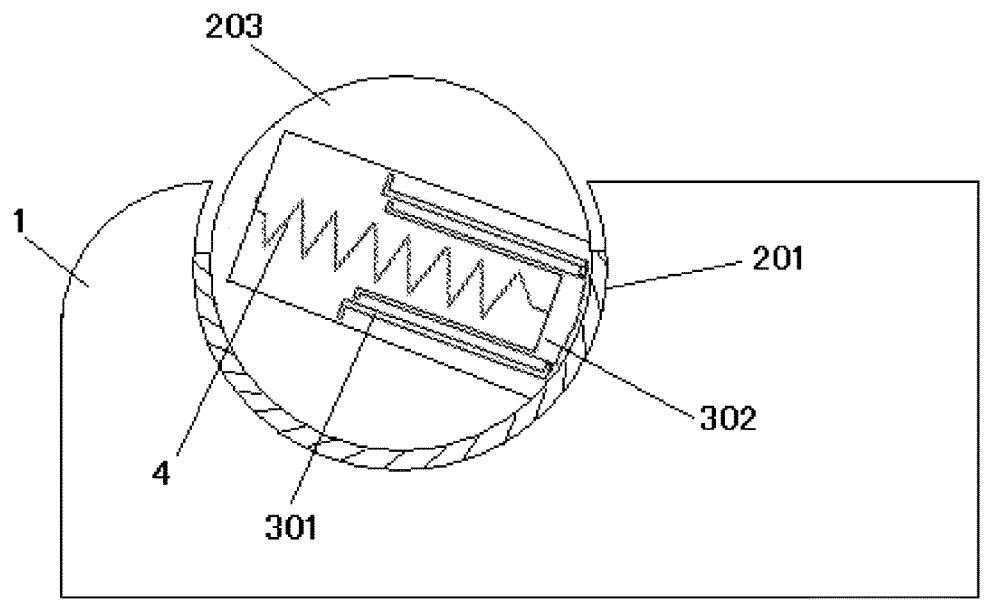
FIG. 7 is a structural cross-sectional view of a telescopic rod in a retracted state according to an embodiment of the present disclosure.

When it is required to support the mobile phone, the ball 203 is rotated so that the end of the multi-stage sleeve 3 is exposed out of the groove 201, then the spring 4 naturally extends, so that the primary sleeve 301 and the secondary sleeve 302 extend out of the ball 203 one by one, as shown in FIG. 3. The multi-stage sleeve 3 rotates along with the ball until it is close to the opening of the groove 201, then structural interference occurs between the multi-stage sleeve 3 and the opening of the groove 201, so that the multi-stage sleeve 3 is clamped, thereby the position thereof is fixed and the support effect for the mobile phone is achieved. Specifically, when the user needs to view the screen in a horizontal orientation, the telescopic rods in the balls at both ends of a long side of the housing are correspondingly extended, shown in FIG. 5; when the user needs to view the screen in a vertical orientation, the telescopic rods in the balls at both ends of a short side of the housing are correspondingly extended, shown in FIG. 6. When it is required to take back the mobile phone, referring to FIG. 7, the secondary sleeve 302 and the primary sleeve 301 are successively pressed into the ball 203, and then the ball 203 is rotated, so that the end of the multi-stage sleeve 3 enters the groove 201. Inside the groove 201, the end of the multi-stage sleeve 3 interferes with an inner wall of the groove 201, thereby the telescopic rod is retracted.

Obviously, the telescopic rod can also be implemented with other telescopic structures, such as a multi-stage chute, a foldable rod, and the like.

It can be seen that, the mobile phone according to the embodiments of the present disclosure is based on the design of the universal ball structure of the corner of the housing, and a telescopic rod is provided in the ball of the universal ball structure for supporting the mobile phone. It has a simple structure, is easy to be used, and saves the space of the housing of the mobile phone.

In an alternative embodiment, in the universal ball structure, a surface area of the portion of the ball emerging from the groove is at least 50% of a surface area of the ball. This structural arrangement of the present embodiment intends to make the portion of the ball emerging from the groove as large as possible, the technical effect of this structural arrangement lies in that it can ensure that the ball in the universal ball structure may be in contact with the ground as much as possible when the mobile phone accidentally drops and the corner of the housing hits the ground, to prevent other parts of the housing other than the corner from first contacting the ground, thereby the universal ball structure in the present embodiment more effectively achieves its shock absorption effect.

Figure 8:
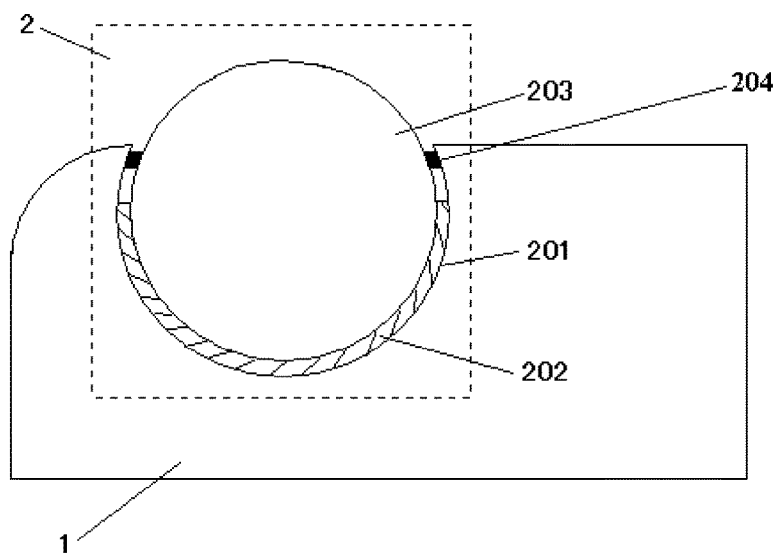
FIG. 8 is a structural cross-sectional view of a corner of a housing of a mobile phone according to another embodiment of the present disclosure.

In an alternative embodiment, in the universal ball structure, a seal 204 is provided between the groove 201 and the ball 203, referring to FIG. 8. In general, the seal 204 is disposed near the opening of the groove 201. In this way, it can prevent dust and impurity from entering the groove during use and therefore prevent damaging the universal ball structure, thereby prolonging service life of the universal ball structure. In a specific implementation, the seal may be any common seal for bearing, such as a nylon seal ring.

In an alternative embodiment, in the telescopic rod, the secondary sleeve is provided with an anti-skid material cladding layer 303 at an end thereof, referring to FIG. 3. By means of the anti-skid material cladding layer at the end of the secondary sleeve, it increases friction between the telescopic rod and a support surface, and therefore can effectively improve support stability.

Alternatively, the multi-stage sleeve may be replaced by a one-stage sleeve, i.e., the telescopic rod has only one sleeve. Specifically, the telescopic rod includes: a sleeve; and a spring arranged in the sleeve in an axis direction of the sleeve. With the spring in a natural state, the sleeve extends out of the ball; and with the spring in a compressed state, the sleeve is fully retracted in the internal of the ball. Alternatively, the sleeve is provided with an anti-skid material cladding layer at an end thereof. Further alternatively, the ball is internally provided with an accommodating groove for accommodating the sleeve, one end of the spring is fixed to an end of the accommodating groove away from an opening of the accommodating groove, and the other end of the spring is fixed to an end of the sleeve.

It can be seen from the above description that, in the handheld electronic device according to the embodiments of the present disclosure, the universal ball structure composed of the groove, the elastic material, and the ball is disposed at the corner of the housing of the handheld electronic device. In this way, when the handheld electronic device accidentally drops, the universal ball structure achieves buffering and shock absorption, thereby effectively reducing the risk of breakage of the edge or corner of the housing of the handheld electronic device and breakage of the screen of the handheld electronic device.

It should be understood by those skilled in the art that, the discussion related to any of the above embodiments is merely exemplary, and it does not intend to imply that the scope of the present disclosure (including the claims) is limited to these examples. Under the teaching of the present disclosure, the technical features in the above embodiments or different embodiments may be combined, the steps may be implemented in any order, and there may be many other modifications to the present disclosure as described above, but they are not provided in detail for the sake of conciseness.

The embodiments of the present disclosure are intended to cover all the replacements, modifications, and variations that fall within the broad scope of the appended claims. Therefore, any omissions, modifications, equivalent replacements, improvements or the like made within the spirit and principle of the present disclosure should be included in the scope of the present disclosure.

What is claimed is:

1. A handheld electronic device comprising a housing, wherein a universal ball structure is provided at a corner of the housing, and the universal ball structure comprises:
    a groove recessed into an outer profile of the housing at the corner of the housing; and
    a ball in the groove,
    wherein a portion of the ball emerges from an opening in the groove to extend beyond the outer profile of the housing.
2. The handheld electronic device according to claim 1, wherein the ball is rollable in the groove.
3. The handheld electronic device according to claim 1, wherein the universal ball structure further comprises an elastic material between the groove and the ball.
4. The handheld electronic device according to claim 3, wherein the elastic material is rubber or elastic polymer.
5. The handheld electronic device according to claim 1, wherein the ball is made of steel, carbon steel or plastic steel.
6. The handheld electronic device according to claim 1, wherein the groove has an accommodating space with a shape between a sphere and a hemisphere, or has an accommodating space with a hemisphere shape, or has an accommodating space with a partial sphere shape smaller than the hemisphere shape.
7. The handheld electronic device according to claim 6, wherein a surface area of the portion of the ball emerging from the groove is at least 50% of a surface area of the ball.
8. The handheld electronic device according to claim 1, wherein the universal ball structure further comprises a seal disposed at an opening of the groove between the groove and the ball.
9. A handheld electronic device comprising a housing, wherein a universal ball structure comprising a groove and a ball in the groove is provided at a corner of the housing, wherein the ball is internally provided with a telescopic rod capable of extending and retracting in a radial direction of the ball, and
    in an extended state, the telescopic rod extends out of the ball, and in a retracted state, the telescopic rod is fully retracted in an interior of the ball.
10. The handheld electronic device according to claim 9, wherein the telescopic rod comprises:
    a sleeve; and
    a spring arranged in the sleeve in an axis direction of the sleeve,
    wherein, with the spring in a natural state, the sleeve extends out of the ball, and with the spring in a compressed state, the sleeve is fully retracted in the interior of the ball.
11. The handheld electronic device according to claim 10, wherein the sleeve is provided with an anti-skid material cladding layer at an end thereof.
12. The handheld electronic device according to claim 10, wherein the ball is internally provided with an accommodating groove for accommodating the sleeve, a first end of the spring is fixed to an end of the accommodating groove away from an opening of the accommodating groove, and a second end of the spring is fixed to an end of the sleeve.
13. The handheld electronic device according to claim 9, wherein the telescopic rod comprises:
    a multi-stage sleeve assembly in which a plurality of sleeves are coaxially arranged and have different diameters; and
    a spring disposed within the multi-stage sleeve assembly in an axis direction of the multi-stage sleeve assembly,
    wherein, with the spring in a natural state, the plurality of sleeves extends out of the ball one by one, and with the spring in a compressed state, the multi-stage sleeve assembly is fully retracted in the interior of the ball.
14. The handheld electronic device according to claim 13, wherein the multi-stage sleeve assembly comprises a primary sleeve and a secondary sleeve, and the secondary sleeve is coaxially disposed within the primary sleeve.
15. The handheld electronic device according to claim 14, wherein the secondary sleeve is provided with an anti-skid material cladding layer at an end thereof.
16. The handheld electronic device according to claim 14, wherein the ball is internally provided with an accommodating groove for accommodating the multi-stage sleeve assembly, a first end of the spring is fixed to an end of the accommodating groove away from an opening of the accommodating groove, and a second end of the spring is fixed to an end of the secondary sleeve.
17. The handheld electronic device according to claim 9, wherein the telescopic rod is made of steel, carbon steel or plastic steel.

* * * * *